US012125332B2

(12) United States Patent
Okamura et al.

(10) Patent No.: US 12,125,332 B2
(45) Date of Patent: Oct. 22, 2024

(54) METHOD FOR MANAGING MONEY HANDLING DEVICE AND MONEY HANDLING DEVICE

(71) Applicant: Glory Ltd., Himeji (JP)

(72) Inventors: Masao Okamura, Himeji (JP); Yukiya Tanaka, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/244,314

(22) Filed: Sep. 11, 2023

(65) Prior Publication Data

US 2024/0087392 A1 Mar. 14, 2024

(30) Foreign Application Priority Data

Sep. 12, 2022 (JP) ................................ 2022-144687

(51) Int. Cl.
*G07D 11/32* (2019.01)
*G07D 11/22* (2019.01)

(52) U.S. Cl.
CPC ............. *G07D 11/32* (2019.01); *G07D 11/22* (2019.01)

(58) Field of Classification Search
CPC ......... G07D 11/32; G07D 11/22; G07D 11/40
See application file for complete search history.

(56) References Cited

U.S. PATENT DOCUMENTS

2014/0012761 A1 1/2014 Schmidt et al.
2021/0125448 A1* 4/2021 Togano .................... B65H 5/28
2021/0192038 A1 6/2021 Shibata

FOREIGN PATENT DOCUMENTS

JP 2000-231648 A 8/2000

* cited by examiner

*Primary Examiner* — Jamara A Franklin
(74) *Attorney, Agent, or Firm* — XSENSUS LLP

(57) ABSTRACT

A money handling device includes a feeding unit; a transport unit; a receiving unit; a recognition unit; and a mount to which a first board or a second board is detachably mounted, a memory configured to store information to be used in money handling and attached to the first board or the second board. The first board holds a first key which is an encryption and decryption key unique to the first board, the second board holds a second key, and the first board and the second board hold a third key which is a common key. In a management method, the first board encrypts the information using the first key and stores the encrypted information in the memory, and encrypts the first key using the third key and stores the encrypted first key in the memory.

12 Claims, 6 Drawing Sheets

METHOD FOR MANAGING MONEY HANDLING DEVICE AND MONEY HANDLING DEVICE

CROSS-REFERENCE TO RELATED APPLICATION

This application claims priority to Japanese Patent Application No. 2022-144687 filed on Sep. 12, 2022, the entire disclosure of which is incorporated herein by reference.

BACKGROUND

A conventional money handling device sequentially takes banknotes of plural denominations placed on a mounting table into the device, and after having recognized the banknotes, sorts the banknotes according to the denomination and stacks the banknotes. Moreover, the conventional money handling device releases rejected banknotes including counterfeit notes to a reject table.

The conventional money handling device includes a board that controls the entire device. The board has a central processing unit (CPU), an external memory, and a card connector. A memory card is detachably attached to the card connector. The memory card stores a recognition program and a recognition table for updating. An internal memory of the CPU stores the recognition program. The external memory stores the recognition table.

In the case of updating the recognition program and/or the recognition table due to various reasons such as an increase in the number of types of banknotes to be recognized, a change in the type of banknote to be recognized, or countermeasure against new counterfeit notes, a maintenance worker attaches the memory card to the card connector. The recognition program in the internal memory and/or the recognition table in the external memory are rewritten to the recognition program and/or the recognition table stored in the memory card.

SUMMARY

The technique disclosed herein relates to a method for managing a money handling device including a feeder configured to feed money to be handled, a transport member having a transport path connected to the feeder and configured to transport money, a receiver connected to the transport path and configured to receive money, a recognition circuit positioned between the feeder and the receiver on the transport path and configured to recognize money, and a mount to which a first board or a second board is detachably mounted, a memory detachably attached to the first board or the second board, the memory configured to store information to be used in money handling and each of the first board and the second board configured to output, using the information read from the memory, a control signal for operating the feeder, the receiver, the transport member, and the recognition circuit to execute the money handling, the method comprising:

holding a first key which is an encryption and decryption key unique to the first board by the first board, holding a second key which is an encryption and decryption key unique to the second board by the second board, holding a third key which is a common encryption and decryption key by each of the first board and the second board, encrypting the information using the first key, and storing the encrypted information in the memory by the first board, and encrypting the first key using the third key, and storing the encrypted first key in the memory by the first board.

DETAILED DESCRIPTION

Figure 1:
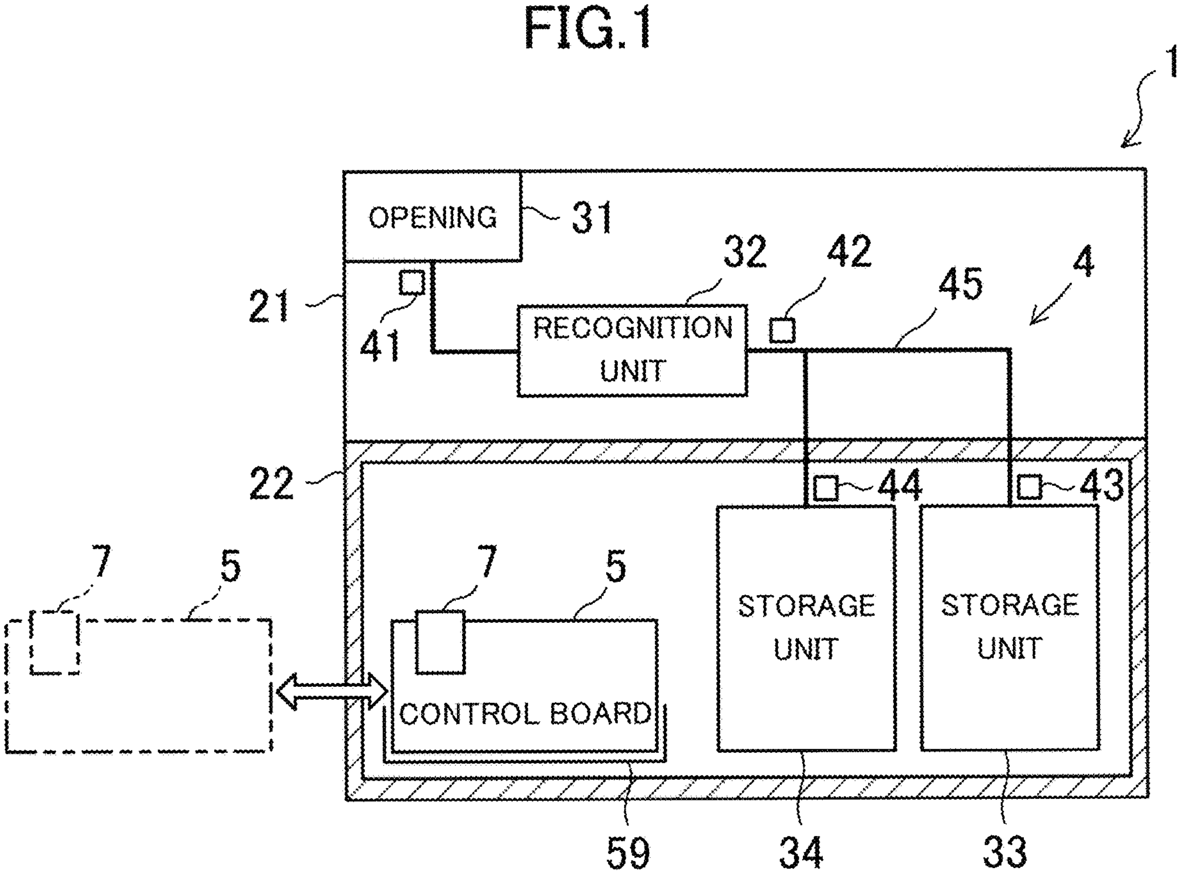
FIG. 1 shows a money handling device.

The money handling device holds various types of information to be used in execution of money handling. These types of information include information unique to the money handling device.

The information unique to the money handling device is stored in a memory such as a memory card in some cases. The memory is detachably attached, for example, to the board that controls the money handling device. The board executes money handling using the information stored in the memory.

The information stored in the memory is encrypted in order to improve security. The board stores, in the memory, the information encrypted using an encryption key unique to the board. Moreover, the board decrypts, using a decryption key corresponding to the encryption key, the information stored in the memory. Note that the encryption key and the decryption key may be the same as each other. Hereinafter, the encryption key and the decryption key will be merely referred to as a key, assuming that the encryption key and the decryption key are the same as each other.

The board is replaced with a new board when broken down. Since the information to be used in execution of money handling is stored in the memory, if the memory is attached to the new board, the money handling device can handle money as in before replacement of the board.

However, if the information stored in the memory is encrypted using the key unique to the board before replacement, the new board does not hold such a key, and for this reason, the new board cannot decrypt the encrypted information read from the memory. The money handling device cannot use the information stored in the memory.

The technique disclosed herein allows the information stored in the memory to be used even in a case where the board is replaced while the security of the information is ensured.

The technique disclosed herein relates to a method for managing a money handling device. The money handling device includes a feeding unit configured to feed money to be handled, a transport unit having a transport path connected to the feeding unit and configured to transport money, a receiving unit connected to the transport path and configured to receive money, a recognition unit positioned between the feeding unit and the receiving unit on the transport path and configured to recognize money, and a mount to which a first board or a second board is detachably mounted.

A memory is detachably attached to the first board or the second board.

The memory stores information to be used in money handling.

Each of the first board and the second board is configured to execute money handling using the information read from the memory.

Each of the first board and the second board is configured to output, using the information read from the memory, a control signal for operating the feeding unit, the receiving unit, the transport unit, and the recognition unit.

In the management method, the first board is configured to hold a first key which is an encryption and decryption key unique to the first board, the second board is configured to hold a second key which is an encryption and decryption key unique to the second board, each of the first board and the second board is configured to hold a third key which is a common encryption and decryption key, the first board is configured to encrypt the information using the first key, and stores the encrypted information in the memory, and the first board is configured to encrypt the first key using the third key, and stores the encrypted first key in the memory.

Here, the memory is a non-volatile memory that keeps the information even when detached from the board. The memory may be, for example, a flash memory.

The feeding unit of the money handling device may be an inlet that feeds money to be handled, which has been received from the outside of the device, into the device. In this case, the transport unit of the money handling device transports the money fed by the inlet. The receiving unit of the money handling device may be a storage unit that stores money to be handled, which has been transported by the transport unit. The storage unit may be a closed storage unit which is positioned in a housing of the money handling device and from which the stored money cannot be taken out from the outside of the money handling device. Alternatively, the storage unit may be an open storage unit which is at least partially opened to the outside of the money handling device and from which the stored money can be taken out from the outside of the money handling device.

Conversely, the feeding unit of the money handling device may be a storage unit that feeds and dispenses stored money to the outside of the device. In this case, the transport unit of the money handling device transports the money fed from the storage unit. The receiving unit of the money handling device may be an outlet that holds the money transported by the transport unit and dispensed to the outside of the device.

The memory attached to the first board stores the information encrypted using the first key unique to the first board and the first key encrypted using the third key common to the plurality of boards.

When the memory is attached to the second board, the second board can decrypt, using the third key, the encrypted first key read from the memory. Moreover, the second board can decrypt, using the decrypted first key, the encrypted information read from the memory. The first board and the second board can share the same memory while the security of the information is ensured by encryption of the information.

In the management method, the second board may be configured to decrypt, using the held third key, the encrypted first key read from the memory. The memory may be attached to the second board mounted to the mount after replacement of the first board.

In the management method, the second board may be configured to decrypt, using the decrypted first key, the encrypted information read from the memory.

After the first board has been replaced with the second board, the money handling device can handle money using the information read from the memory.

In the management method, in a case where the second key held in the second board is different from the decrypted first key, the second board may be configured to rewrite the held second key to the first key. The second board may be configured to hold the first key.

Since the second key is rewritten to the first key, the second board is the substantially same board as the first board.

In the management method, in a case where the encrypted first key is not stored in the memory attached to the second board, the second board may be configured to encrypt the second key using the third key, and store the encrypted second key in the memory.

The memory storing no encrypted key stores no encrypted information. Such a memory is a new memory. When the encrypted second key unique to the second board is stored in the memory, such a memory can be used as a memory that stores information unique to the money handling device.

In the management method, the second board may be configured to newly generate the second key.

With the new second key, the security of the information encrypted using the second key is enhanced.

The encrypted information stored in the memory may be information for specifying the money handling device.

The receiving unit may be a storage unit that stores money, and the encrypted information stored in the memory may be information on the type of money stored in the storage unit.

Here, the type of money includes a denomination of money and a category of money.

The encrypted information stored in the memory may be information as a criterion for recognition by the recognition unit.

Here, the recognition criterion includes a threshold for each fitness factor for determining the category.

The encrypted information stored in the memory may be information on adjustment of a sensor included in the money handling device.

These types of information are information unique to the money handling device and used in money handling.

The technique disclosed herein relates to a money handling device. The money handling device includes a feeding unit configured to feeds money to be handled, a transport unit having a transport path connected to the feeding unit and configured to transport money, a receiving unit connected to the transport path and configured to receive money, a recognition unit positioned between the feeding unit and the receiving unit on the transport path and configured to recognize money, and a mount to which a first board or a second board that executes money handling is detachably mounted.

A memory is configured to store information to be used in money handling and detachably attached to the first board or the second board.

Each of the first board and the second board is configured to execute money handling using the information read from the memory.

Each of the first board and the second board is configured to output, using the information read from the memory, a control signal for operating the feeding unit, the receiving unit, the transport unit, and the recognition unit.

The first board is configured to hold a first key which is an encryption and decryption key unique to the first board, the second board is configured to hold a second key which is an encryption and decryption key unique to the second board, and each of the first board and the second board is configured to hold a third key which is a common encryption and decryption key, the first board is configured to encrypt the information using the first key, and store the encrypted information in the memory, and the first board is configured to encrypt the first key using the third key, and store the encrypted first key in the memory.

The money handling device can ensure the security of the information. Moreover, the first board and the second board can share the same memory.

In a case where the memory is attached to the second board mounted to the mount after replacement of the first board, the second board may be configured to decrypt, using the held third key, the encrypted first key read from the memory, and the second board may be configured to decrypt, using the decrypted first key, the encrypted information read from the memory.

In a case where the board is replaced, the money handling device can handle money using the information stored in the memory.

The first board may have a first secure elements, the first board may be configured to store the first key and the third key in the first secure element.

The second board may have a second secure element, the second board may be configured to store the second key and the third key in the second secure element.

This configuration enhances the security of the information stored in the memory.

Hereinafter, an embodiment of a method for managing a money handling device and an embodiment of the money handling device will be described with reference to the drawings. The method for managing the money handling device and the money handling device described herein are examples.

(Configuration of Money Handling Device)

Figure 6:
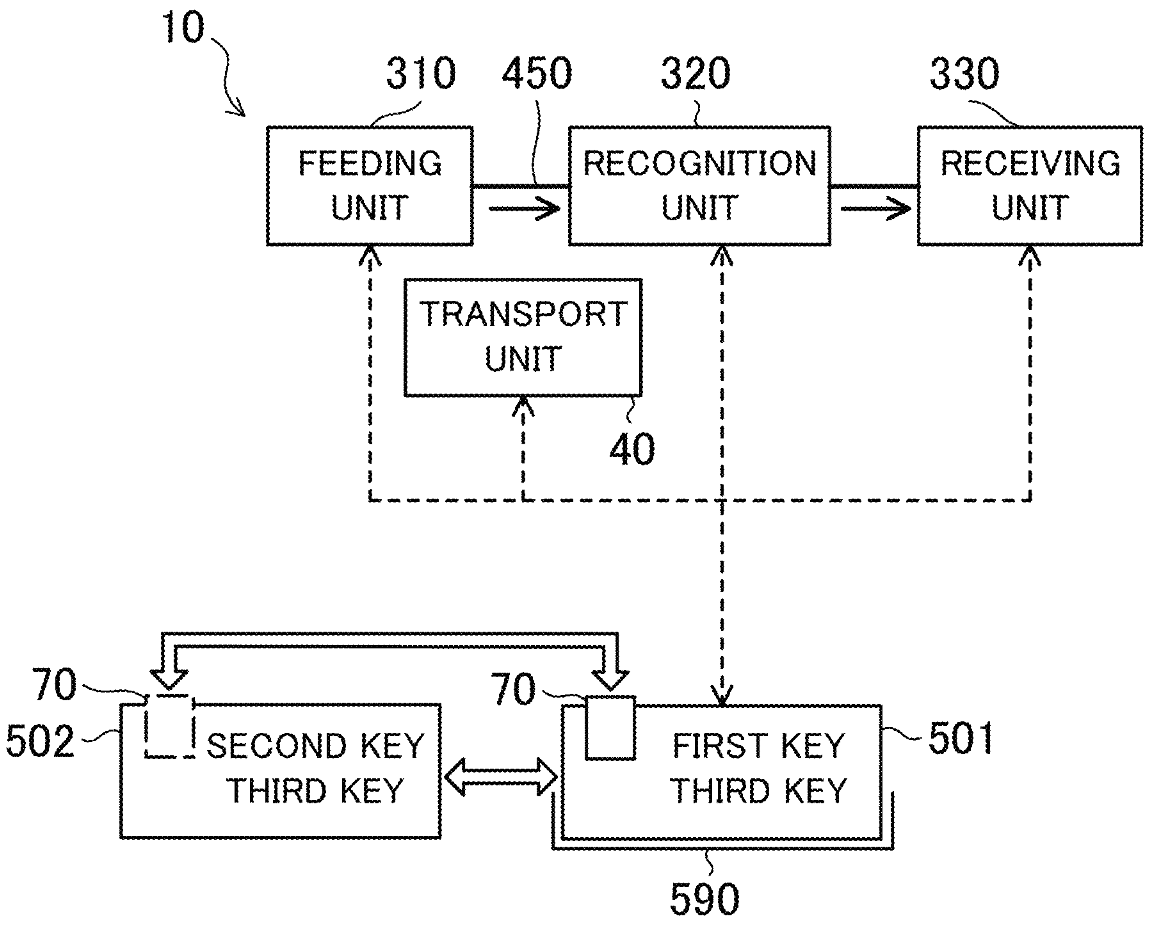
FIG. 6 shows a money handling device.

FIG. 6 shows a money handling device 10. The money handling device 10 includes a feeding unit 310, a transport unit 40, a receiving unit 330, a recognition unit 320, and a mount 590.

The feeding unit 310 feeds money to be handled. The transport unit 40 has a transport path 450 connected to the feeding unit 310, and transports money. The receiving unit 330 is connected to the transport path 450, and receives money. The recognition unit 320 is positioned on the transport path 450 between the feeding unit 310 and the receiving unit 330, and recognizes money. As indicated by solid arrows in FIG. 6, money is transported from the feeding unit 310 to the receiving unit 330 via the recognition unit 320.

A first board 501 or a second board 502 is detachably mounted to the mount 590. A memory 70 is detachably attached to the first board 501 or the second board 502. The memory 70 stores information to be used in money handling. The first board 501 attached to the mount 590 outputs, using the information read from the memory 70, a control signal for operating the feeding unit 310, the receiving unit 330, the transport unit 40, and the recognition unit 320 (see dashed arrows in FIG. 6). The first board 501 may directly transmit the control signal to the feeding unit 310, the receiving unit 330, the transport unit 40, and the recognition unit 320. The first board 501 may indirectly transmit the control signal to at least one of the feeding unit 310, the receiving unit 330, the transport unit 40, or the recognition unit 320 via another board, for example. With this configuration, the first board 501 executes money handling. When the second board 502 is mounted to the mount 590, the second board 502 outputs, as in the first board 501, a control signal for operating the feeding unit 310, the receiving unit 330, the transport unit 40, and the recognition unit 320 using the information read from the memory 70.

The first board 501 holds a first key which is an encryption and decryption key unique to the first board 501, the second board 502 holds a second key which is an encryption and decryption key unique to the second board 502, and the first board 501 and the second board 502 hold a third key which is a common encryption and decryption key.

The first board 501 encrypts the information using the first key, and stores the encrypted information in the memory 70. Moreover, the first board 501 encrypts the first key using the third key, and stores the encrypted first key in the storage medium 70. By encryption of the information, the security of the information is ensured.

After the memory 70 has been attached to the second board 502 replaced with the first board 501 and mounted to the mount 590, the second board 502 decrypts, using the held third key, the encrypted first key read from the memory 70, and using the decrypted first key, decrypts the encrypted information read from the memory 70.

Since the first key is encrypted using the third key, the first board 501 and the second board 502 can share the same memory 70. For example, after the first board 501 has been replaced with the second board 502 due to breakdown, the money handling device 10 can handle money using the information read from the memory 70 while ensuring the security of the information by encryption of the information.

The configuration of each modification of the money handling device as described below is applicable to the money handling device of FIG. 6 separately or in combination with other configurations within a rational range. Moreover, the method for managing the money handling device as described below is applicable to the money handling device of FIG. 6 and the modifications thereof within a rational range.

FIG. 1 shows an example of a money handling device 1. The money handling device 1 of FIG. 1 is a modification of the money handling device 10 of FIG. 6.

The money handling device 1 executes processing related to money. The money handling device 1 handles only banknotes, only coins, or both banknotes and coins. The money handling device 1 executes, for example, depositing as money handling. In depositing, money to be deposited is taken into the device. The money handling device 1 may execute, for example, withdrawal as money handling. In withdrawal, money to be withdrawn is taken out of the device. The money handling device 1 may execute money handling other than depositing and withdrawal. The money handling device 1 is installed, for example, in a service office of a bank. A teller or a customer of the bank uses the money handling device 1. Note that the installation location of the money handling device 1 is not limited.

The money handling device 1 includes an opening 31, a recognition unit 32, storage units 33, 34, a transport unit 4, and a control board 5.

The opening 31 is formed in an upper housing 21 of the money handling device 1. The opening 31 connects the inside and outside of the upper housing 21. At least part of the opening 31 is opened to the outside of the upper housing 21.

The opening 31 is, for example, an inlet. The inlet holds money to be handled, and delivers the held money from the outside to the inside of the upper housing 21. The opening 31 is one example of a feeding unit. An operator places, with a hand, money to be deposited into the inlet, for example.

The opening 31 is, for example, an outlet. The outlet ejects money to be handled from the inside to the outside of the upper housing 21, and holds the ejected money. The opening 31 is one example of a receiving unit. The operator takes out money to be withdrawn, which is held by the outlet, with a hand from the outlet, for example.

The opening 31 may have both the functions of the inlet and the outlet.

The money handling device 1 has the two storage units 33, 34. The two storage units 33, 34 may have the same structure or different structures. Note that the money handling device 1 is not limited to one having the two storage units 33, 34. The number of storage units is an arbitrary number.

Both the storage units 33, 34 are housed in a lower housing 22. The lower housing 22 and the upper housing 21 are stacked on each other with the lower housing 22 on the lower side and the upper housing 21 on the upper side. The lower housing 22 is a safe housing. The lower housing 22 protects a housed object stronger than the upper housing 21. The operator cannot access money stored in the storage units 33, 34.

The storage units 33, 34 store money. Various well-known structures may be employed as the structures of the storage units 33, 34. In a case where money is banknotes, the storage units 33, 34 may be so-called stack type storage units. The storage units 33, 34 may be so-called wind-up type storage units.

The storage units 33, 34 store money to be handled, which is delivered from the opening 31, for example. In this case, the opening 31 is equivalent to the feeding unit, and the storage units 33, 34 are equivalent to the receiving unit.

The storage units 33, 34 may have mechanisms that feeds out stored money from the storage units 33, 34. The storage units 33, 34 feed out money to be handled from the storage units 33, 34, for example. The opening 31 ejects the money fed out from the storage units 33, 34 from the inside to the outside of the upper housing 21, and holds such money. In this case, the storage units 33, 34 are equivalent to the feeding unit, and the opening 31 is equivalent to the receiving unit.

Note that the storage units 33, 34 are not necessarily housed in the lower housing 22. For example, the storage unit 33 may be housed in the lower housing 22, and the storage unit 34 may be housed in the upper housing 21.

In a case where the storage units 33, 34 are not housed in the lower housing 22, part of the storage units 33, 34 may be opened to the outside of the money handling device 1. The storage units 33, 34 may be, for example, open stackers. The operator can take out, with a hand, money stored in the storage units 33, 34. Note that the money handling device 1 is not necessarily the device including the safe housings. The money handling device 1 including the open stackers may be a so-called sorting machine. The sorting machine sorts money to be handled according to various conditions.

The storage units 33, 34 may be so-called temporary storage units that temporarily stores money to be handled.

The transport unit 4 has a transport path 45. The transport unit 4 transports money one by one along the transport path 45. The transport path 45 has a well-known structure including a combination of a plurality of rollers, a plurality of belts, motors that drives these rollers and belts, and a plurality of guides. The transport path 45 connects the opening 31 and the storage units 33, 34 to each other. The transport path 45 is diverged, between the recognition unit 32 and the storage units 33, 34, into a transport path connected to the storage unit 33 and a transport path connected to the storage unit 34. A diverter is set at a location where the transport path 45 is diverged. The diverter selects a money transport route.

The transport unit 4 has sensors 41, 42, 43, 44. Each sensor 41, 42, 43, 44 is an optical, ultrasonic, or mechanical sensor, and detects passage of money. Each sensor 41, 42, 43, 44 outputs a detection signal to the control board 5.

Each sensor 41, 42, 43, 44 is installed on a predetermined location on the transport path 45. In the money handling device 1 of FIG. 1, the sensor 41 is installed at a location where the opening 31 and the transport path 45 are connected to each other, and the sensor 42 is installed near the location where the transport path 45 is diverged. The sensor 43 is installed at a location where the storage unit 33 and the transport path 45 are connected to each other, and the sensor 44 is installed at a location where the storage unit 34 and the transport path 45 are connected to each other.

The recognition unit 32 recognizes money. The recognition unit 32 is positioned between the opening 31 and the storage units 33, 34 on the transport path 45. The recognition unit 32 has optical, magnetic, ultrasonic, and/or mechanical sensors. The recognition unit 32 acquires, using one or more sensors of these sensors, various types of information on money which is being transported. The recognition unit 32 recognizes at least the authenticity, denomination, and fitness of money. The recognition unit 32 outputs a recognition signal to the control board 5.

The control board 5 is installed in the lower housing 22. A mount 59 is provided in the lower housing 22. The control board 5 is detachably mounted to the mount 59. Note that the control board 5 may be installed in the upper housing 21.

The control board 5 mounted to the mount 59 outputs a control signal for operating the opening 31, the recognition unit 32, the storage unit 33, 34 and the transport unit 4. With this configuration, the money handling device 1 handles money.

Although details will be described later, a memory 7 is detachably attached to the control board 5. The memory 7 stores information to be used in money handling. The control board 5 outputs the control signal using the information read from the memory 7.

(Configuration of Board)

Figure 2:
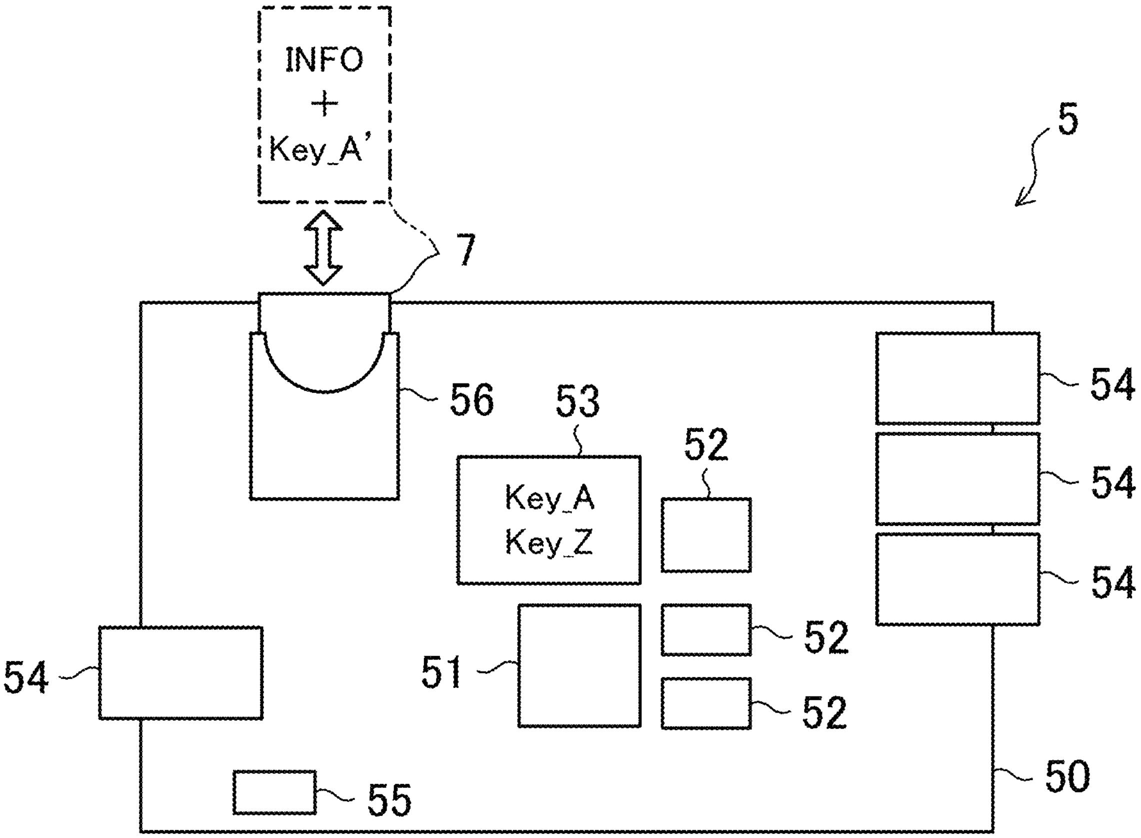
FIG. 2 shows a control board.

FIG. 2 shows an example of the control board 5. The control board 5 has a plate-shaped body 50. Various components 51 to 56 are implemented on the body 50.

For example, the CPU 51 and the external memory 52 are implemented on the body 50. The external memory 52 is a non-volatile memory. The external memory 52 stores a basic program, for example. The CPU 51 controls the money handling device 1 according to the basic program stored in the external memory 52.

The external memory 52 further stores various types of information on the money handling device 1. The information stored in the external memory 52 is information common to money handling devices 1 of the same type as the money handling device 1 among the information used in money handling. The common information is different from information unique to the money handling device 1 as described later.

For example, the secure element 53 may be implemented on the body 50. The secure element 53 is, for example, a trusted platform module (TPM). Hereinafter, the secure element 53 and the TPM are substantially synonymous with each other.

The secure element 53 generates an encryption key and a decryption key, encrypts the information using the generated encryption key, and decrypts the encrypted information using the decryption key. The encryption key and the decryption key may be the same as each other or different from each other. In the money handling device 1 disclosed herein, the encryption key and the decryption key are the same as each other. Hereinafter, the encryption key and the decryption key will be merely referred to as a key. The secure element 53 has an internal memory. The internal memory stores the key.

For example, the input/output port 54 may be implemented on the body 50. The control board 5 receives detection signals of the sensors 41 to 44 and a recognition signal of the recognition unit 32 via the input/output port 54, and outputs the control signal for operating the opening 31, the recognition unit 32, the storage unit 33, and the transport unit 4.

For example, the power port 55 may be implemented on the body 50. The control board 5 is supplied with power via the power port 55.

For example, the socket 56 detachably attached to the memory 7 may be implemented on the body 50. The socket 56 is one example of the attachment unit. The memory 7 is, for example, a memory card. The memory card includes a flash memory as a non-volatile memory. The memory card may be specifically a SD card. The memory 7 may be a universal serial bus (USB) flash drive. Note that in the money handling device 1, the memory 7 is a memory card.

As described above, the memory 7 stores the information to be used in money handling. The information stored in the memory 7 is information unique to the money handling device 1. Specifically, the memory 7 stores at least one of the following types of information (1) to (4).

(1) Information for Specifying Money Handling Device 1

More specifically, this information is a device ID and/or an IP address assigned to the money handling device 1. The device ID or the IP address varies according to the money handling device 1, and therefore, is information unique to the money handling device 1.

(2) Denomination or Category of Money Stored in Storage Units 33, 34

A category is a category such as fit money, unfit money, and rejected money. Note that the fit money is less-damaged or -stained circulatable money. The unfit money is, for example, greatly-damaged or -stained money not suitable for circulation. The rejected money is money which cannot be accepted by the money handling device 1. The rejected money includes money which cannot be recognized by the recognition unit 32 and counterfeit money.

A specific example of the information on the denomination or category of money stored in the storage units 33, 34 includes information indicating that the storage unit 33 stores money of a particular denomination and the storage unit 34 stores money of a denomination other than the particular denomination and information indicating that the storage unit 33 stores fit money and the storage unit 34 stores unfit money. Such information is set information necessary for handling money by the money handling device 1. A user sets the denomination or category of money stored in the storage units 33, 34 according to a requirement such as the purpose of use of the money handling device 1. The denomination or category of money stored in the storage units 33, 34 varies according to the money handling device 1.

(3) Information on Recognition Criterion of Recognition Unit

This information is information as a criterion for distinguishing money based on the information acquired by the recognition unit 32. This information may be information on a threshold for each fitness factor for determining the category of money, for example. Note that the fitness factor is a factor for recognizing that money is not the fit money, and in the case of a banknote, includes (a) a stained banknote, (b) a torn banknote, and (c) a partially-mutilated banknote, for example. The information on the threshold for each fitness factor includes information as a criterion for distinguishing the rejected money based on the information acquired by the recognition unit 32.

The threshold is set to a default threshold when the money handling device 1 is shipped from a factory. However, according to a requirement such as use environment of the money handling device 1, the user may change the threshold for each fitness factor. For example, in the case of use environment where relatively greatly stained money is to be handled, if the threshold is the default threshold, the number of money determined as the unfit money is too great. Moreover, if the threshold is the default threshold, the number of money determined as the rejected money is too great in some cases. In these cases, the user changes the threshold in order to properly determine the fit money, the unfit money, or the rejected money. In association with the change in the threshold by the user, the information on the threshold is changed to information unique to the money handling device 1. The changed information on the threshold is information optimized for the money handling device 1.

(4) Information on Adjustment Value for Sensor of Recognition Unit 32 and Adjustment Values for Sensors 41 to 44 Installed on Transport Path 45

An adjustment value for the sensor is set to a default adjustment value when the money handling device 1 is shipped from the factory. Depending on a requirement such as the use environment of the money handling device 1 or due to time degradation, the adjustment value needs to be changed in order for the sensor to output an accurate detection signal in some cases. The change in the adjustment value is, for example, a change in the light sensitivity of the sensor, and is made by a maintenance worker.

In some cases, the adjustment value for the sensor is automatically adjusted while the money handling device 1 is repeatedly handling money.

After the adjustment value for the sensor has been changed from the default value, information on such an adjustment value is information unique to the money handling device 1. The information on the changed adjustment value is information optimized for the money handling device 1.

The information unique to the money handling device 1 may include log data which is the history of money handling performed by the money handling device 1 and an error caused during money handling.

As shown in FIG. 2, the memory 7 is detachable from the control board 5. In order to improve the security, the secure element 53 encrypts the information to be stored in the memory 7. The secure element 53 generates a key (e.g., Key_A) unique to the control board 5, and encrypts the information using the Key_A. The control board 5 stores the encrypted information in the memory 7.

When money handling is executed, the secure element 53 decrypts the encrypted information read from the memory 7 using the Key_A. The control board 5 executes money handling using the decrypted information.

Using the unique key, the control board 5 encrypts the information to be stored in the memory 7 and decrypts the information stored in the memory 7. All the control boards 5 of the individual money handling devices 1 hold unique keys. Even if the memory 7 is detached from the first money handling device 1 and is attached to the control board 5 of the second money handling device 1, the control board 5 of the second money handling device 1 cannot decrypt the information read from the memory 7. The security of the information stored in the memory 7 is improved.

(Method for Managing Money Handling Device when Board Replacement is Required)

For example, in some cases, while the money handling device 1 is continuously in use, the control board 5 needs to be replaced due to breakdown of the control board 5. As shown in FIG. 1, the control board 5 is detachably mounted to the mount 59. In a case where the control board 5 needs to be replaced, the maintenance worker can detach the control board 5 (first board 5A, see FIG. 3) from the mount 59, and attach a new control board 5 (second board 5B) to the mount 59.

The memory 7 is detachably attached to the socket 56 of the control board 5. The maintenance worker can detach the memory 7 from the first board 5A, and attach the memory 7 to the socket 56 of the second board 5B.

However, the information stored in the memory 7 is encrypted using the Key_A (i.e., first key) by the secure element 53 of the first board 5A. The Key_A is a key unique to the first board 5A. The secure element 53 of the replaced second board 5B cannot decrypt the encrypted information read from the memory 7. As described above, the memory 7 stores the information (1) to (4) unique to the money handling device 1. If these types of unique information cannot be used after replacement of the control board 5, this situation may pose a problem for money handling by the money handling device 1.

For this reason, the money handling device 1 disclosed herein is configured such that the information stored in the memory 7 can be used even after replacement of the control board 5.

The control board 5 of the money handling device 1 stores, in the memory 7, not only the encrypted information but also the encrypted key (above-described Key_A) used for encryption of the information. A key for encrypting the key is a key common to a plurality of control boards 5. Hereinafter, the key common to the plurality of control boards 5 will be referred to as Key_Z (i.e., third key). The secure element 53 of the control board 5 holds the key unique to such a board and the common key (Key_Z).

The method for managing the money handling device 1 will be described with reference to FIG. 3. The first board 5A is the control board 5 before replacement. As described above, the secure element 53 of the first board 5A holds the unique key Key_A. Moreover, the memory 7 stores the information encrypted using the Key_A.

The secure element 53 of the first board 5A also holds the Key_Z. As described above, the Key_Z is common to the plurality of control boards 5. The later-described second board 5B also holds the Key_Z.

The secure element 53 of the first board 5A encrypts the Key_A using the Key_Z. The first board 5A also stores the encrypted key Key_A' in the memory 7.

The second board 5B is a board with which the first board 5A is replaced and which is mounted to the mount 59 of the money handling device 1. The secure element 53 of the second board 5B holds a unique Key_B (i.e., second key) and the common Key_Z. The key Key_B unique to the second board 5B and the key Key_A unique to the first board 5A are different from each other.

Figure 3:
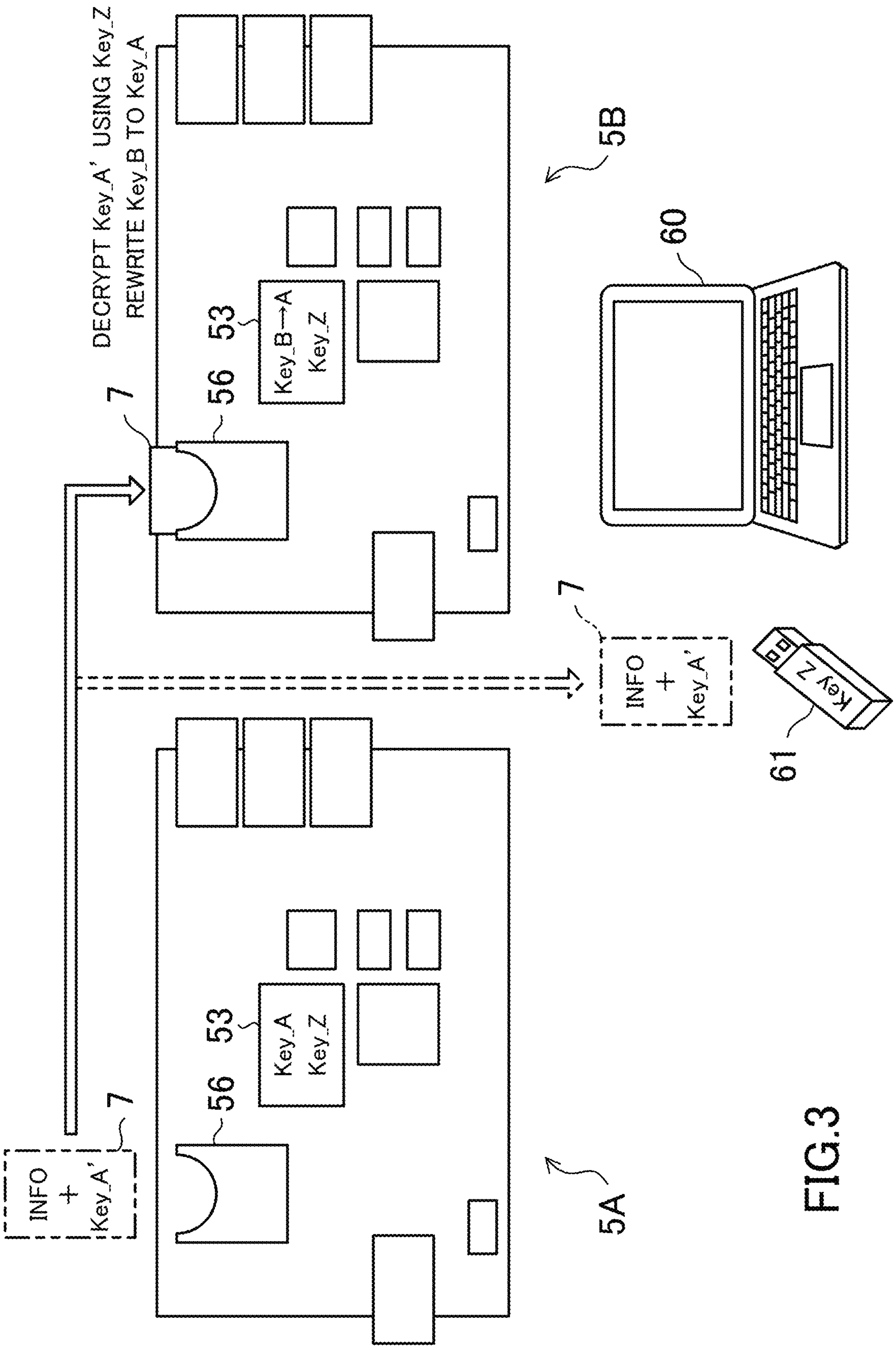
FIG. 3 is a diagram for describing control when board replacement is required.

As indicated by a white arrow in FIG. 3, when the memory 7 detached from the first board 5A is attached to the second board 5B, the second board 5B reads the encrypted Key_A' from the memory 7. The secure element 53 decrypts the encrypted Key_A' using the Key_Z. The second board 5B can acquire the Key_A.

Moreover, the secure element 53 of the second board 5B rewrites the unique Key_B to the decrypted Key_A. Accordingly, the second board 5B is the substantially same as the first board 5A before replacement. When money handling is executed, the secure element 53 of the second board 5B can decrypt, using the Key_A, the encrypted information read from the memory 7. The money handling device 1 can smoothly handle money using the unique information stored in the memory 7 even after replacement of the control board 5.

Note that the maintenance worker can read the information in the memory 7 detached from the control board 5 using a personal computer 60 and a security dongle 61 as shown in FIG. 3. The security dongle 61 is a storage medium holding the Key_Z. The security dongle 61 can be connected to the personal computer 60. In order to ensure the security, the security dongle 61 can be owned only by the maintenance worker. The personal computer 60 to which the memory 7 and the security dongle 61 are connected decrypts the encrypted Key_A' read from the memory 7 using the Key_Z. Moreover, the personal computer 60 decrypts the encrypted information read from the memory 7 using the Key_A. The maintenance worker can check the information unique to the money handling device 1, e.g., the log data.

(Control Steps in Money Handling Device)

Next, control steps in the money handling device 1 will be described with reference to FIGS. 4 and 5.

Figure 4:
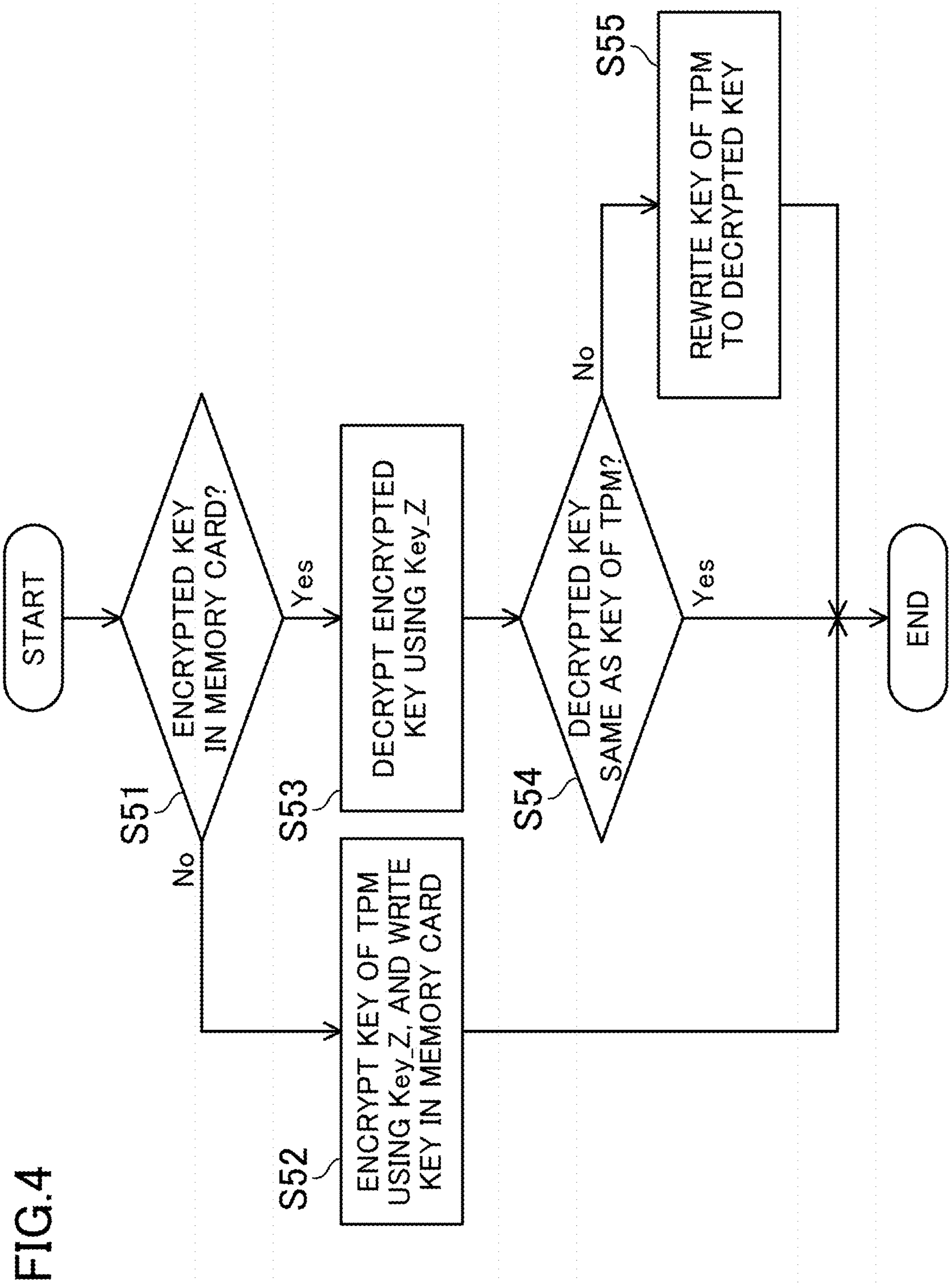
FIG. 4 is a flowchart of control in board checking in booting.

FIG. 4 shows control steps in board checking in booting in the money handling device 1. For the flowchart of FIG. 4, the order of steps may be changed within a range possible, some steps may be omitted, or a step(s) may be added. The flowchart of FIG. 4 starts after the money handling device 1 is powered on.

In Step S51 after the start, the control board 5 determines whether or not the encrypted key is stored in the attached memory card. In a case where the memory card is the memory card attached to the control board 5 before replacement, the answer of Step S51 is Yes.

In a case where the answer of Step S51 is No, the control board 5 encrypts the unique key held in the TPM (i.e., secure element 53) using the Key_Z, and stores the encrypted key in the memory card, in Step S52. After the unique key encrypted by the control board 5 has been stored in the memory card, such a memory card can be used as the memory card storing the encrypted information unique to the money handling device 1.

Note that in Step S52, the TPM may generate a new key and store the key in the memory 7 and the internal memory of the TPM. With the new key, the security of the information is enhanced.

In a case where the answer of Step S51 is Yes, the control board 5 reads the encrypted key from the memory card, and decrypts the encrypted key using the Key_Z held in the TPM, in Step S53.

Subsequently in Step S54, the control board 5 determines whether or not the decrypted key is the same as the unique key held in the TPM. In a case where the control board 5 is replaced and the memory 7 attached to the control board 5 before replacement is attached to the control board 5 after replacement, the answer of Step S54 is No.

In a case where the answer of Step S54 is No, the control board 5 rewrites, in Step S55, the unique key held in the TPM to the key decrypted in Step S53. Such a control board 5 is the substantially same as the control board 5 before replacement. Step S55 is processing of adapting the control board 5 after replacement to the control board 5 before replacement.

In a case where the answer of Step S54 is Yes, the information stored in the memory card can be decrypted using the unique key held in the TPM. The adaptation processing of Step S55 is skipped. In a case where the same control board 5 is attached again to the mount 59 after the control board 5 has been detached from the mount 59, i.e., a case where the control board 5 is not replaced and there is no change in the memory 7, the answer of Step S54 is Yes.

Note that in the flowchart of FIG. 4, a step of determining whether or not the memory card attached to the control board 5 is a regular memory card may be added before Step S51. In a case where the memory card is the regular memory card, the control board 5 makes determination of Step S51. In a case where the memory card is not the regular memory card, the control board does not perform Steps S51 to S55.

Figure 5:
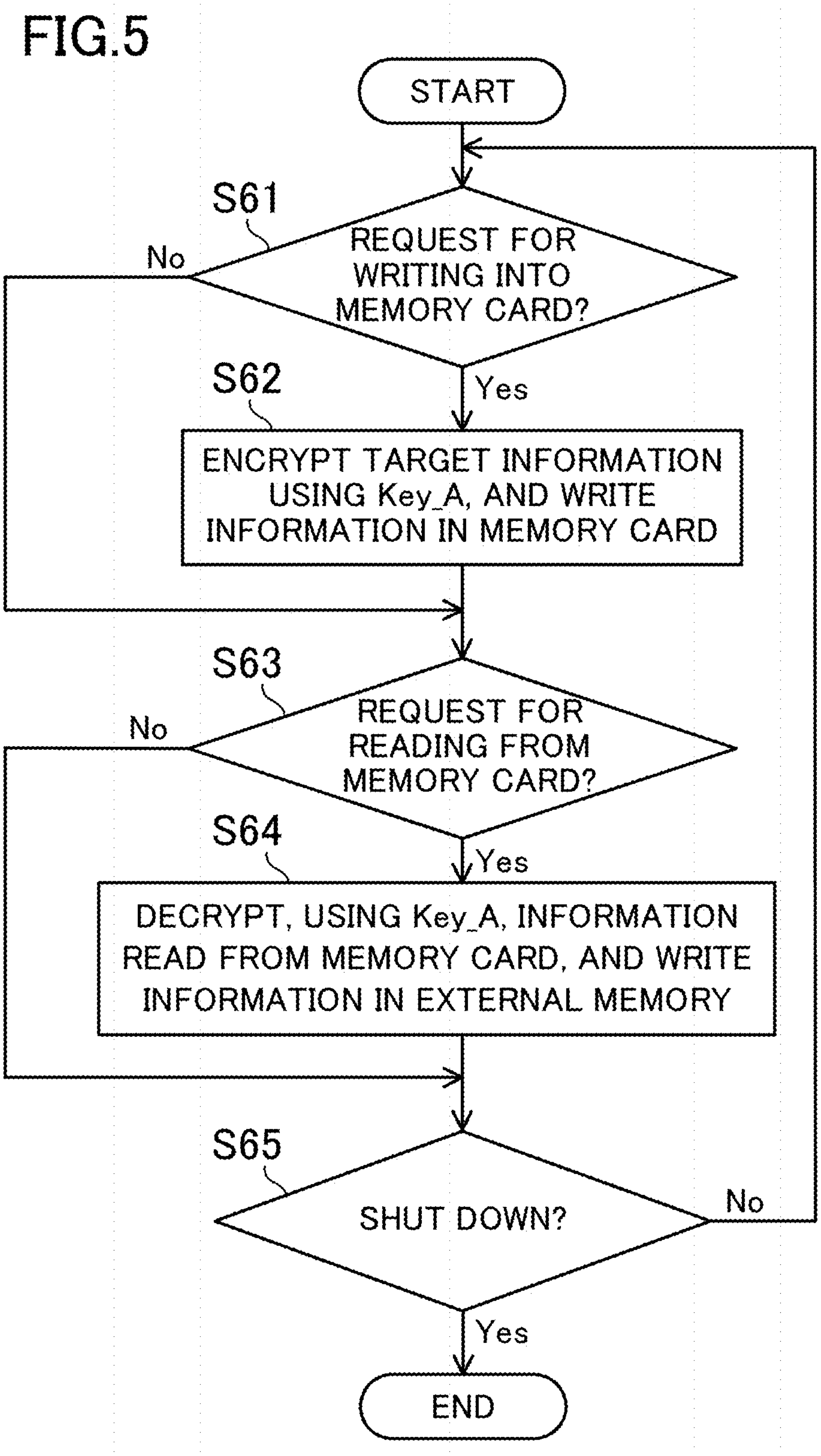
FIG. 5 is a flowchart of reading and writing control for a memory during operation of the device.

FIG. 5 is a flowchart of reading and writing control for the memory 7 during operation of the money handling device 1. The flowchart of FIG. 5 is performed as needed while the money handling device 1 is ON. Note that in the flowchart of FIG. 5, the control board 5 (i.e., first board) of the money handling device 1 holds the unique Key_A and the common Key_Z. For the flowchart of FIG. 5, the order of steps may be changed within a range possible, some steps may be omitted, or a step(s) may be added.

In Step S61 after the start, the control board 5 determines whether or not a request for writing into the memory card (i.e., memory 7) has been made. The writing request is generated by another type of software for executing money handling or another type of software for detecting or eliminating an error. Note that in shutdown for stopping the device, the writing request may be generated.

In a case where the answer of Step S61 is Yes, the control board 5 encrypts requested information using the Key_A and writes the information in the memory card, in Step S62. In a case where the answer of Step S61 is No, Step S62 is skipped.

In Step S63, the control board 5 determines whether or not a request for reading from the memory card has been made. The reading request is also generated by another type of software for executing money handling or another type of software for detecting or eliminating an error. Note that in booting for starting the device, the reading request may be generated.

In a case where the answer of Step S63 is Yes, the control board 5 reads the information from the memory card, decrypts the information using the Key_A, and writes the information in the external memory 52, in Step S64. At this time, the control board 5 may read only necessary information from the memory card. Note that in a case where the answer of Step S63 is No, Step S64 is skipped.

In a case where the device is shut down, the process of this flowchart ends. In a case where the device is not shut down, the process of this flowchart returns to Step S61.

According to the method for managing the money handling device 1 and the money handling device 1 as disclosed herein, the control board 5 encrypts the key (above-described Key_A) used for encryption of the information using the key (above-described Key_Z) common to the plurality of control boards 5, and stores the encrypted key in the memory 7. Thus, the security of the information can be ensured by encryption of the information while the plurality of control boards 5 shares the same memory. In a case where the control board 5 is replaced, the money handling device 1 can use the information stored in the memory 7.

Note that the money handling device 1 shown in FIG. 1 is one example and the money handling device to which the method for managing the money handling device as disclosed herein is applicable is not limited to the money handling device 1 of FIG. 1. The money handling device is only required to include at least the feeding unit, the transport unit, the receiving unit, the recognition unit, and the mount. The method for managing the money handling device is broadly applicable to a depositing machine for depositing, a withdrawal machine for withdrawal, a depositing and dispensing machine for depositing and withdrawal, and a sorting machine for money sorting.

What is claimed is:

1. A method for managing a money handling device including a feeder configured to feed money to be handled, a transport member having a transport path connected to the feeder and configured to transport money, a receiver connected to the transport path and configured to receive money, a recognition circuit positioned between the feeder and the receiver on the transport path and configured to recognize money, and a mount to which a first board or a second board is detachably mounted, a memory detachably attached to the first board or the second board, the memory configured to store information to be used in money handling and each of the first board and the second board configured to output, using the information read from the memory, a control signal for operating the feeder, the receiver, the transport member, and the recognition circuit to execute the money handling, the method comprising:

holding a first key which is an encryption and decryption key unique to the first board by the first board, holding a second key which is an encryption and decryption key unique to the second board by the second board, holding a third key which is a common encryption and decryption key by each of the first board and the second board, encrypting the information using the first key, and storing the encrypted information in the memory by the first board, and encrypting the first key using the third key, and storing the encrypted first key in the memory by the first board.

2. The method for managing the money handling device according to claim 1, further comprising:

decrypting, using the held third key, the encrypted first key read from the memory by the second board, the memory attached to the second board mounted to the mount after replacement of the first board, and decrypting, using the decrypted first key, the encrypted information read from the memory by the second board.

3. The method for managing the money handling device according to claim 2, further comprising:

in a case where the second key held in the second board is different from the decrypted first key, rewriting the held second key to the first key by the second board.

4. The method for managing the money handling device according to claim 2, further comprising:

in a case where the encrypted first key is not stored in the memory attached to the second board, encrypting the second key using the third key, and storing the encrypted second key in the memory by the second board.

5. The method for managing the money handling device according to claim 4, further comprising:

newly generating the second key by the second board.

6. The method for managing the money handling device according to claim 1, wherein the encrypted information stored in the memory is information for specifying the money handling device.

7. The method for managing the money handling device according to claim 1, wherein the receiver is a storage that stores money, and the encrypted information stored in the memory is information on a type of money stored in the storage.

8. The method for managing the money handling device according to claim 1, wherein the encrypted information stored in the memory is information as a criterion for recognition by the recognition circuit.

9. The method for managing the money handling device according to claim 1, wherein the encrypted information stored in the memory is information on adjustment of a sensor included in the money handling device.

10. A money handling device comprising:

a feeder configured to feed money to be handled;

a transport member having a transport path connected to the feeder and configured to transport money;

a receiver connected to the transport path and configured to receive money;

a recognition circuit positioned between the feeder and the receiver on the transport path and configured to recognize money; and a mount to which a first board or a second board is detachably mounted, a memory configured to store information to be used in money handling and detachably attached to the first board or the second board and each of the first board and the second board configured to output, using the information read from the memory, a control signal for operating the feeder, the receiver, the transport member, and the recognition circuit to execute the money handling, wherein the first board is configured to hold a first key which is an encryption and decryption key unique to the first board, the second board is configured to hold a second key which is an encryption and decryption key unique to the second board, and each of the first board and the second board is configured to hold a third key which is a common encryption and decryption key, the first board is configured to encrypt the information using the first key, and store the encrypted information in the memory, and the first board is configured to encrypt the first key using the third key, and store the encrypted first key in the memory.

11. The money handling device according to claim 10, wherein in a case where the memory is attached to the second board mounted to the mount after replacement of the first board, the second board is configured to decrypt, using the held third key, the encrypted first key read from the memory, and the second board is configured to decrypt, using the decrypted first key, the encrypted information read from the memory.

12. The money handling device according to claim 10, wherein the first board has a first secure element, the second board has a second secure element, the first board is configured to store the first key and the third key in the first secure element, and the second board is configured to store the second key and the third key in the second secure element.

* * * * *